(12) United States Patent
Quigley et al.

(10) Patent No.: US 7,152,632 B2
(45) Date of Patent: Dec. 26, 2006

(54) SYSTEMS AND METHODS FOR PIPELINE REHABILITATION

(75) Inventors: Peter A. Quigley, Duxbury, MA (US); Michael Feechan, Sagamore, MA (US)

(73) Assignee: Fiberspar Corporation, New Bedford, MA (US)

( * ) Notice: Subject to any disclaimer, the term of this patent is extended or adjusted under 35 U.S.C. 154(b) by 0 days.

(21) Appl. No.: 11/305,876

(22) Filed: Dec. 16, 2005

(65) Prior Publication Data

US 2006/0137754 A1      Jun. 29, 2006

Related U.S. Application Data

(62) Division of application No. 10/402,857, filed on Mar. 28, 2003, now Pat. No. 6,978,804.

(60) Provisional application No. 60/368,503, filed on Mar. 29, 2002.

(51) Int. Cl.
    *F16L 55/16* (2006.01)

(52) U.S. Cl. .................... 138/98; 138/97; 156/287; 156/294; 264/269; 264/516; 405/150.1; 405/184.4

(58) Field of Classification Search ................ 138/98, 138/97; 156/287, 294; 264/269, 516; 405/150.1, 405/171, 184, 184.4
    See application file for complete search history.

(56) References Cited

U.S. PATENT DOCUMENTS

| | | | |
|---|---|---|---|
| 646,887 A | 4/1900 | Stowe et al. | 174/47 |
| 1,930,285 A | 10/1933 | Robinson | 138/143 |
| 2,648,720 A | 8/1953 | Alexander | 174/34 |
| 2,690,769 A | 10/1954 | Brown | 138/55 |
| 2,725,713 A | 12/1955 | Blanchard | 57/149 |
| 2,810,424 A | 10/1957 | Swartswelter et al. | 154/1.8 |
| 3,116,760 A | 1/1964 | Matthews | 138/125 |
| 3,277,231 A | 10/1966 | Downey et al. | 174/47 |
| 3,334,663 A | 8/1967 | Peterson | 138/132 |
| 3,379,220 A | 4/1968 | Kiuchi et al. | 138/125 |
| 3,477,474 A | 11/1969 | Mesler | 138/133 |
| 3,507,412 A | 4/1970 | Carter | 214/338 |
| 3,522,413 A | 8/1970 | Chrow | 219/301 |
| 3,554,284 A | 1/1971 | Nystrom | 166/250 |
| 3,579,402 A | 5/1971 | Goldsworthy et al. | 156/392 |
| 3,589,135 A * | 6/1971 | Ede | 405/184 |
| 3,604,461 A | 9/1971 | Matthews | 138/137 |
| 3,606,402 A | 9/1971 | Medney | 285/305 |
| 3,677,978 A | 7/1972 | Dowbenko et al. | 260/2 |
| 3,692,601 A | 9/1972 | Goldsworthy et al. | 156/74 |

(Continued)

FOREIGN PATENT DOCUMENTS

DE      3603597      8/1987

(Continued)

OTHER PUBLICATIONS

Austigard E. and R. Tomter, "Composites Subsea: Cost Effective Products; and Industry Challenge," Subsea 94 International Conference, the 1994 Report on Subsea Engineering : The Continuing Challenges.

(Continued)

*Primary Examiner*—Patrick Brinson
(74) *Attorney, Agent, or Firm*—Goodwin Procter LLP

(57) ABSTRACT

The present disclosure is directed to methods and systems for pipeline rehabilitation. The methods and systems disclosed herein permit the rehabilitation of long lengths of previously installed pipe and minimize the need for creating multiple access points to the pipeline. The disclosed systems and methods are particularly suited for rehabilitating buried and undersea pipelines or pipelines installed in areas of restricted access.

14 Claims, 4 Drawing Sheets

U.S. PATENT DOCUMENTS

| | | | |
|---|---|---|---|
| 3,700,519 A | 10/1972 | Carter | 156/156 |
| 3,701,489 A | 10/1972 | Goldsworthy et al. | 242/7.21 |
| 3,734,421 A | 5/1973 | Karlson et al. | 242/7.21 |
| 3,738,637 A | 6/1973 | Goldsworthy et al. | 269/61 |
| 3,740,285 A | 6/1973 | Goldsworthy et al. | 159/173 |
| 3,769,127 A | 10/1973 | Goldsworthy et al. | 156/172 |
| 3,773,090 A * | 11/1973 | Ghersa et al. | 138/141 |
| 3,783,060 A | 1/1974 | Goldsworthy et al. | 156/69 |
| 3,828,112 A | 8/1974 | Johansen et al. | 174/47 |
| 3,856,052 A | 12/1974 | Feucht | 138/119 |
| 3,860,742 A | 1/1975 | Medney | 174/84 S |
| 3,933,180 A | 1/1976 | Carter | 138/89 |
| 3,956,051 A | 5/1976 | Carter | 156/429 |
| 3,957,410 A | 5/1976 | Goldsworthy et al. | 425/183 |
| 3,960,629 A | 6/1976 | Goldsworthy | 156/180 |
| RE29,112 E | 1/1977 | Carter | 156/156 |
| 4,048,807 A * | 9/1977 | Ellers et al. | 405/159 |
| 4,053,343 A | 10/1977 | Carter | 156/172 |
| 4,057,610 A | 11/1977 | Goettler et al. | 264/108 |
| 4,095,865 A | 6/1978 | Denison et al. | 339/16 R |
| 4,108,701 A | 8/1978 | Stanley | 156/160 |
| 4,125,423 A | 11/1978 | Goldsworthy | 156/428 |
| 4,133,972 A | 1/1979 | Anderson et al. | 174/47 |
| 4,137,949 A | 2/1979 | Linko, III et al. | 138/125 |
| 4,139,025 A | 2/1979 | Carlstrom | 138/153 |
| 4,190,088 A | 2/1980 | Lalikos et al. | 138/126 |
| 4,200,126 A | 4/1980 | Fish | 138/143 |
| 4,220,381 A | 9/1980 | van der Graaf | 339/16 C |
| 4,241,763 A | 12/1980 | Antal et al. | 138/127 |
| 4,248,062 A | 2/1981 | McLain et al. | 64/1 |
| 4,261,390 A | 4/1981 | Belofsky | 138/125 |
| 4,303,457 A | 12/1981 | Johansen et al. | 156/149 |
| 4,308,999 A | 1/1982 | Carter | 242/7.02 |
| 4,336,415 A | 6/1982 | Walling | 174/47 |
| 4,446,892 A | 5/1984 | Maxwell | 138/104 |
| 4,463,779 A | 8/1984 | Wink et al. | 138/125 |
| 4,507,019 A | 3/1985 | Thompson | 405/154 |
| 4,515,737 A | 5/1985 | Karino et al. | 264/22 |
| 4,522,235 A | 6/1985 | Kluss et al. | 138/130 |
| 4,530,379 A | 7/1985 | Policelli | 138/109 |
| 4,556,340 A | 12/1985 | Morton | 405/195 |
| 4,578,675 A | 3/1986 | MacLeod | 340/855 |
| 4,627,472 A | 12/1986 | Goettler et al. | 138/174 |
| 4,657,795 A | 4/1987 | Foret | 428/36 |
| 4,681,169 A | 7/1987 | Brookbank, III | 166/385 |
| 4,728,224 A | 3/1988 | Salama et al. | 405/195 |
| 4,789,007 A | 12/1988 | Cretel | 138/174 |
| 4,849,668 A | 7/1989 | Crawley et al. | 310/328 |
| 4,859,024 A | 8/1989 | Rahman | 350/96.23 |
| 4,941,774 A * | 7/1990 | Harmstorf | 405/158 |
| 4,992,787 A | 2/1991 | Helm | 340/854 |
| 5,097,870 A | 3/1992 | Williams | 138/115 |
| 5,170,011 A | 12/1992 | Martucci | 174/47 |
| 5,172,765 A | 12/1992 | Sas-Jaworsky et al. | 166/384 |
| 5,176,180 A | 1/1993 | Williams et al. | 138/125 |
| 5,182,779 A | 1/1993 | D'Agostino et al. | 385/13 |
| 5,184,682 A | 2/1993 | Delacour et al. | 166/385 |
| 5,188,872 A | 2/1993 | Quigley | 428/36.2 |
| 5,209,136 A | 5/1993 | Williams | 74/502.5 |
| 5,222,769 A | 6/1993 | Kaempen | 285/45 |
| 5,285,008 A | 2/1994 | Sas-Jaworsky et al. | 174/47 |
| 5,285,204 A | 2/1994 | Sas-Jaworsky | 340/854.9 |
| 5,330,807 A | 7/1994 | Williams | 428/34.5 |
| 5,334,801 A | 8/1994 | Mohn | 174/47 |
| 5,348,096 A | 9/1994 | Williams | 166/384 |
| 5,351,752 A | 10/1994 | Wood et al. | 166/68 |
| 5,394,488 A | 2/1995 | Fernald et al. | 385/13 |
| 5,395,913 A | 3/1995 | Böttcher et al. | 204/782 |
| 5,426,297 A | 6/1995 | Dunphy et al. | 250/227.23 |
| 5,428,706 A | 6/1995 | Lequeux | 392/472 |
| 5,435,867 A | 7/1995 | Wolfe et al. | 156/171 |
| 5,443,099 A | 8/1995 | Chaussepied et al. | 138/109 |
| RE35,081 E | 11/1995 | Quigley | 428/36.2 |
| 5,469,916 A | 11/1995 | Sas-Jaworsky et al. | 166/64 |
| 5,499,661 A | 3/1996 | Odru et al. | 138/124 |
| 5,525,698 A | 6/1996 | Böttcher et al. | 313/721 |
| 5,551,484 A | 9/1996 | Charboneau | 138/104 |
| 5,641,956 A | 6/1997 | Vengsarkar et al. | 250/227.14 |
| 5,730,188 A | 3/1998 | Kalman et al. | 138/135 |
| 5,755,266 A | 5/1998 | Aanonsen et al. | 138/174 |
| 5,795,102 A * | 8/1998 | Corbishley | 405/171 |
| 5,828,003 A | 10/1998 | Thomeer et al. | 174/69 |
| 5,908,049 A | 6/1999 | Williams et al. | 138/125 |
| 5,913,337 A | 6/1999 | Williams et al. | 138/125 |
| 5,921,285 A | 7/1999 | Quigley et al. | 138/125 |
| 5,933,945 A | 8/1999 | Thomeer et al. | 29/825 |
| 5,951,812 A | 9/1999 | Gilchrist, Jr. | 156/304.2 |
| 6,004,639 A | 12/1999 | Quigley et al. | 428/36.3 |
| 6,016,845 A | 1/2000 | Quigley et al. | 138/125 |
| 6,136,216 A | 10/2000 | Fidler et al. | 252/62 |
| 6,148,866 A | 11/2000 | Quigley et al. | 138/125 |
| 6,209,587 B1 | 4/2001 | Hsich et al. | 138/137 |
| 6,286,558 B1 | 9/2001 | Quigley et al. | 138/125 |
| 6,361,299 B1 | 3/2002 | Quigley et al. | 425/35.9 |
| 6,461,079 B1 * | 10/2002 | Beaujean | 405/171 |
| 6,663,453 B1 * | 12/2003 | Quigley et al. | 441/133 |
| 6,978,804 B1 * | 12/2005 | Quigley et al. | 138/98 |
| 2002/0081083 A1 | 6/2002 | Griffioen et al. | 385/109 |
| 2002/0119271 A1 | 8/2002 | Quigley et al. | 441/133 |
| 2003/0008577 A1 | 1/2003 | Quigley et al. | 428/36.9 |
| 2003/0087052 A1 | 5/2003 | Wideman | 428/36.4 |

FOREIGN PATENT DOCUMENTS

| | | |
|---|---|---|
| DE | 4214383 C1 | 9/1993 |
| EP | 0024512 A1 | 3/1981 |
| EP | 0024512 B1 | 3/1981 |
| EP | 352148 A1 | 1/1990 |
| EP | 505815 A2 | 9/1992 |
| EP | 505815 A3 | 9/1992 |
| EP | 0854029 A2 | 7/1998 |
| EP | 0854029 A3 | 4/1999 |
| EP | 0970980 A1 | 1/2000 |
| GB | 553110 | 8/1942 |
| GB | 2255994 A | 11/1992 |
| GB | 2270099 A | 3/1994 |
| WO | 91/13925 | 9/1991 |
| WO | 92/21908 | 12/1992 |
| WO | 93/19927 | 10/1993 |
| WO | 00/31458 | 6/2000 |

OTHER PUBLICATIONS

Connell Mike et al., "Coiled Tubing: Application for Today's Challenges," Petroleum Engineer International, pp. 18-21 (Jul. 1999).

Feechan Mike et al., "Spoolable Composites Show Promise," The American Oil & Gas Reporter, pp. 44-50 (Sep. 1999).

Fowler Hampton, "Advanced Composite Tubing Usable," The American Oil & Gas Reporter, pp. 76-81 (Sep. 1997).

Fowler Hampton et al., "Development Update and Applications of an Advanced Composite Spoolable Tubing," Offshore Technology Conference held in Houston Texas from 4th to 7th of May 1998, pp. 157-162.

Hahn H. Thomas and Williams G. Jerry, "Compression Failure Mechanisms in Unidirectional Composites," NASA Technical Memorandum pp. 1-42 (Aug. 1984).

Hansen et al., "Qualification and Verification of Spoolable High Pressure Composite Service Lines for the Asgard Field Development Project," paper presented at the 1997 Offshore Technology Conference held in Houston Texas from 5th to 8th of May 1997, pp. 45-54.

Haug et al., "Dynamic Umbilical with Composite Tube (DUCT)," Paper presented at the 1998 Offshore Technology Conference held in Houston Texas from 4th to 7th, 1998, pp. 699-712.

Lundberg et al., "Spin-off Technologies from Development of Continuous Composite Tubing Manufacturing Process," Paper presented at the 1998 Offshore Technology Conference held in Houston, Texas from 4th to 7th of May 1998, pp. 149-155.

Marker et al., "Anaconda: Joint Development Project Leads to Digitally Controlled Composite Coiled Tubing Drilling System," Paper presented at the SPEI/ COTA, Coiled Tubing Roundtable held in Houston, Texas from 5th to 6th of Apr. 2000, pp. 1-9.

Measures R. M., "Smart Structures with Nerves of Glass," Prog. Aerospace Sci. 26(4): 289-351 (1989).

Measures et al., "Fiber Optic Sensors for Smart Structures," Optics and Lasers Engineering 16: 127-152 (1992).

Poper Peter, "Braiding," International Encyclopedia of Composites, Published by VGH, Publishers, Inc., New York, NY 10010.

Quigley et al., "Development and Application of a Novel Coiled Tubing String for Concentric Workover Services," Paper presented at the 1997 Offshore Technology Conference held in Houston, Texas from 5th to 8th of May 1997, pp. 189-202.

Sas-Jaworsky II and Bell Steve, "Innovative Applications Stimulate Coiled Tubing Development," World Oil , 217(6): 61 (Jun. 1996).

Sas-Jaworsky IIand Mark Elliot Teel, "Coiled Tubing 1995 Update: Production Applications," World Oil, 216 (6): 97 (Jun. 1995).

Sas-Jaworsky, A. and J.G. Williams, "Advanced composites enhance coiled tubing capabilities," World Oil, pp. 57-69 (Apr. 1994).

Sas-Jaworsky, A. and J.G. Williams, "Development of a composite coiled tubing for oilfield services," Society of Petroleum Engineers, SPE 26536, pp. 1-11 (1993).

Sas-Jaworsky, A. and J.G. Williams, "Enabling capabilities and potential applications of composite coiled tubing," Proceedings of World Oil's 2nd International Conference on Coiled Tubing Technology, pp. 2-9 (1994).

Sas-Jaworsky II Alex, "Developments Position CT for Future Prominence," The American Oil & Gas Reporter, pp. 87-92 (Mar. 1996).

Tore Wood Moe et al., "Spoolable, Composite Piping for Chemical and Water Injection and Hydraulic Valve Operation," Proceedings of the 11th International Conference on Offshore Mechanics and Arctic Engineering-1992-, vol. III, Part A- Materials Engineering, pp. 199-207 (1992).

Shuart J. M. et al., "Compression Behavior of ≠45°-Dominated Laminates with a Circular Hole or Impact Damage," AIAA Journal 24(1): 115-122 (Jan. 1986).

Silverman A. Seth, "Spoolable Composite Pipe for Offshore Applications," Materials Selection & Design, pp. 48-50 (Jan. 1997).

Rispler K. et al., "Composite Coiled Tubing in Harsh Completion/ Workover Environments," Paper presented at the SPE GAS Technology Symposium and Exhibition held in Calgary, Alberta, Canada, on mar. 15-18, 1998, pp. 405-410.

Williams G. J. et al., "Composite Spoolable Pipe Development, Advancements, and Limitations," Paper presented at the 2000 Offshore Technology Conference held in Houston Texas from 1st to 4th of May 2000, pp. 1-16.

International Search Report dated Jul. 3, 2003.

* cited by examiner

SYSTEMS AND METHODS FOR PIPELINE REHABILITATION

RELATED APPLICATION INFORMATION

This application is a divisional application of U.S. Ser. No. 10/402,857, which claims priority to provisional U.S. Patent Application 60/368,503 filed Mar. 29, 2002, all of which are hereby incorporated by reference in their entirety.

BACKGROUND

Pipelines for transporting fluids such as oil and natural gas may deteriorate over time potentially resulting in leakage of fluid from the pipeline. In the case of metal piping, for example, corrosion may be a significant cause of pipe deterioration. Repair of previously installed piping may be difficult and expensive, particularly in the case of buried or submerged pipelines where access to the pipeline is restricted. Successful repair of buried pipeline may require multiple access points, resulting in significant disturbances of the areas proximate the access points and potentially adverse environmental impact at each area. For these reasons, there is a need for improved systems and methods for rehabilitating pipelines.

SUMMARY

The present disclosure is directed to methods and systems for pipeline rehabilitation. The methods and systems disclosed herein permit the rehabilitation of long lengths of previously installed pipe and minimize the need for creating multiple access points to the pipeline. The disclosed systems and methods are particularly suited for rehabilitating buried and undersea pipelines or pipelines installed in areas of restricted access.

In one exemplary embodiment, a method of rehabilitating a pipeline comprising a first pipe comprises inserting a second pipe into the first pipe and pushing and pulling a length of the second pipe through the first pipe. The first pipe may act as a conduit for installing the second pipe and the second pipe, once installed, may be utilized to transport fluids in place of the first pipe, thereby rehabilitating the pipeline. The exemplary method may also include providing a first access point in the first pipe for insertion of the second pipe and providing a second access point in the first pipe that is spaced apart from the first access point and permits the second pipe to pulled through the first pipe. Pushing and pulling the second pipe through the first pipe may better control the position of the second pipe within the first pipe and may reduce tensile strain on the second pipe. The second pipe may be simultaneously pushed and pulled through the first pipe and/or alternatively pushed and pulled through the first pipe.

The exemplary method may also include flooding the first pipe with a fluid, such as water, prior to pushing and pulling the second pipe through the first pipe. The buoyancy of the second pipe in the flooded first pipe may be controlled to facilitate pushing and pulling of the second pipe through the first pipe. For example, in certain embodiments, the exemplary method may include adjusting the buoyancy of the second pipe to approximately neutral buoyancy or to minimal negative buoyancy, for example, to a weight of approximately 0.10 lbs. per ft. in water. The buoyancy of the second pipe may be adjusted by coupling a buoyancy control layer to the second pipe. The buoyancy control layer may be a layer of material(s) having a density selected to adjust the overall density of the second pipe to provide a desired buoyancy to the second pipe. The buoyancy control layer may be coupled to the pipe by extruding a material having the desired density onto the exterior of the second pipe, by wrapping a material having the desired density onto the exterior of the pipe, or by other methods of coupling a layer of material to the exterior or other portion of a pipe. The buoyancy control layer may be coupled to the second pipe during fabrication of the second pipe or in a post-fabrication process. The material of the buoyancy control layer may be selected to provide increased wear resistance to the second pipe and to reduce the coefficient of friction of the exterior of the second pipe.

In other exemplary embodiments, the method may include flooding the first pipe with a fluid having a density selected to provide a desired buoyancy to the second pipe. For example, a dense fluid, such as brine or water-based drilling mud, may be delivered to the first pipe to flood the first pipe such that the second pipe has neutral or minimal negative buoyancy within the dense fluid. In an exemplary embodiment, the buoyancy of the second pipe may be controlled by both flooding the first pipe with a fluid and coupling a buoyancy control layer to the second pipe.

The exemplary method may include introducing friction reducing fluids to the interior of the first pipe to reduce friction forces between the first pipe and the second pipe as the second pipe is pushed/pulled through the first pipe. The friction reducers may be fluids such as oils or other lubricants that are pumped into the first pipe before or during the pushing/pulling operation.

In other exemplary methods, sensors and/or transmitters may be affixed to or integral with the second pipe, affixed to the first device, affixed to the second device, or may be affixed to or integral with the first pipe to measure pipeline rehabilitation process parameters, such as, for example, the axial and radial location of the second pipe relative to the first pipe, fluid leakage within the first or second pipe, and strain on the second pipe. Exemplary sensors include, for example, load cells, displacement transducers, accelerometers, acoustic transmitters, clearance gauges, and imaging devices.

In one exemplary embodiment, a system for rehabilitating a pipeline comprising a first pipe comprises a first device adapted to be coupled to a first portion of a second pipe, the first device being configured to push a length of the second pipe into a first access point of the first pipe, and a second device adapted to be coupled to a second portion of the second pipe, the second device being configured to pull the second pipe through a second access point in the first pipe, the second access point being spaced apart a distance from the first access point. The first device may be an injector, a hydraulically or otherwise operated reel upon which the second pipe is mounted, and/or other devices suitable for deploying long lengths of pipe. The second device may be a capstan, a winch, a tractor, propulsion jets, and/or other devices suitable for pulling long lengths of pipe, cables, ropes, or cords. The first device and the second device may be operated simultaneously to affect the simultaneous pushing and pulling of the first pipe through the second pipe.

In one exemplary embodiment, a method of adjusting the buoyancy characteristics of a pipe includes providing a pipe and adding a layer of material having a density selected to modify the overall density of the pipe. The additional layer may be extruded onto an exterior layer of the pipe; deposited, for example, wrapped, wound or sprayed, onto the exterior of the pipe; or otherwise coupled to the pipe. In one embodiment, the additional layer may be a layer of thermoplastic foam extruded onto an exterior layer of the first pipe.

BRIEF DESCRIPTIONS OF THE DRAWINGS

These and other features and advantages of the systems and methods disclosed herein will be more fully understood by reference to the following detailed description in conjunction with the attached drawings in which like reference numerals refer to like elements throughout the different views. The drawings illustrate principals of systems and methods disclosed herein and, although not to scale, show relative dimensions.

DETAILED DESCRIPTION OF EXEMPLARY EMBODIMENTS

Figure 1:
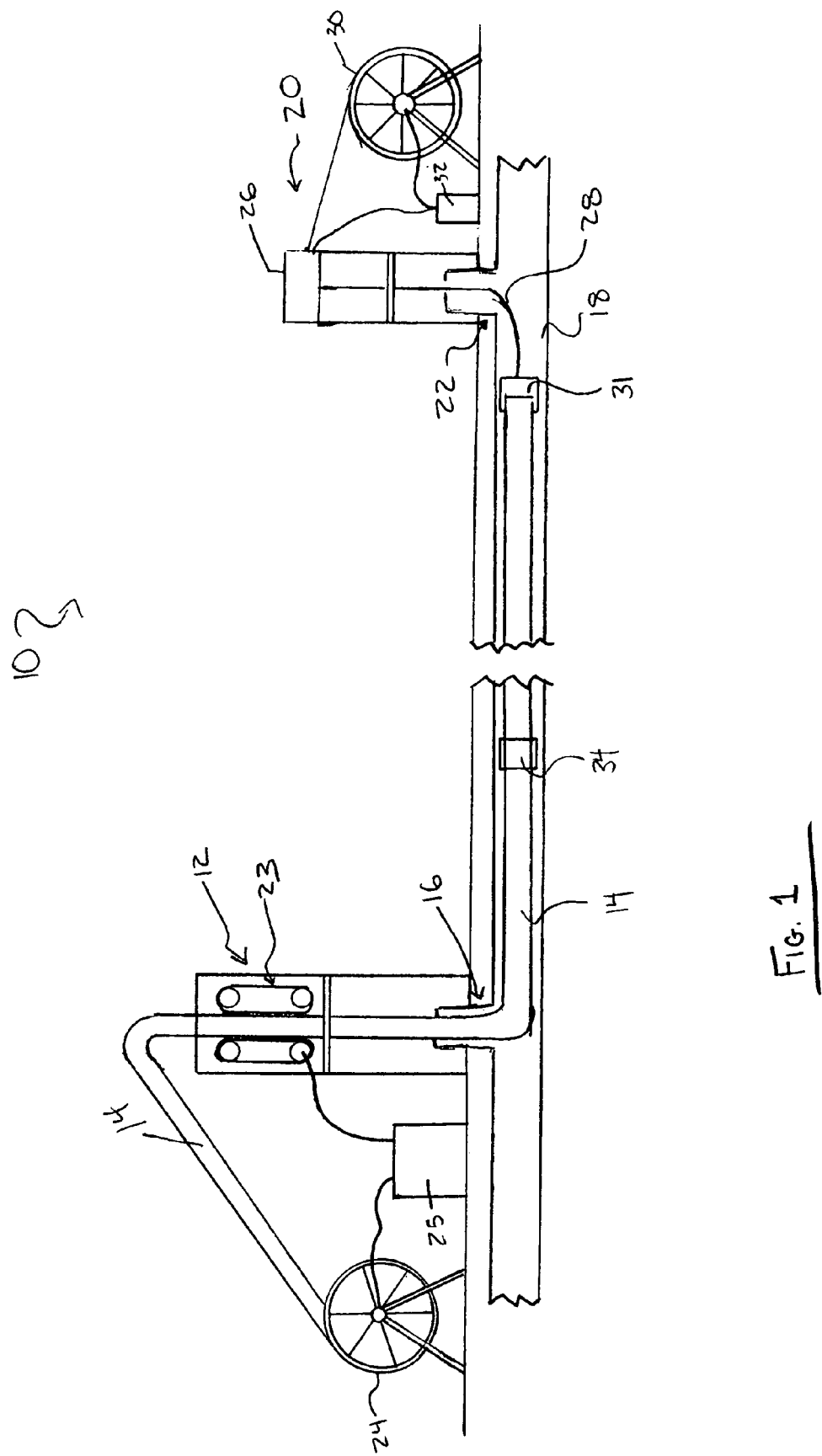
FIG. 1 is a schematic view of a system for pipeline rehabilitation.

FIG. 1 illustrates an exemplary embodiment of a system 10 for rehabilitating a pipeline comprising a first pipe. The system 10 comprises a first device 12 that is configured to push a length of a second pipe 14 into a first access point 16 of the first pipe 18. The system 10 further includes a second device 20 that is configured to pull the second pipe 14 through a second access point 22 in the first pipe 18. The system 10 operates to push and/or pull the second pipe 14 through the first pipe 18. During operation, the first pipe 18 acts as a conduit for installing the second pipe 14. The second pipe 14, once installed, may be utilized to transport fluids in place of the first pipe 18, thereby rehabilitating the pipeline. The exemplary system 10 permits the rehabilitation of the pipeline with a minimum number of access points in the first pipe 18 comprising the pipeline. In the illustrated embodiment, for example, two access points 16, 22 are provided in the first pipe 18.

The systems and methods for pipeline rehabilitation described herein, including the exemplary system 10, are particularly suited for rehabilitation of buried and undersea pipeline and other pipelines in which access to the pipeline may be restricted. In the illustrated embodiment, for example, the first pipe 18 comprising the pipeline is buried underground. One skilled in the art will appreciate that the systems and methods described herein are not limited to buried or undersea pipelines but instead may be utilized to effect rehabilitation of any installed pipelines. Likewise, the orientation of the first device 12 and the orientation of the second device 20 relative to the first pipe 18, and in the exemplary embodiment, relative to the ground, may be varied. For example, the first device 12 and the second device 20 may be oriented to introduce the second pipe 14 at an angle proximate to 90° relative the first pipe 18 as illustrated in FIG. 1, at angle proximate to 0° (i.e., parallel) to the first pipe 18, or at any other angle.

Continuing to refer to FIG. 1, the first device 12 of the exemplary system 10 may comprise an injector 23 that operates to engage the exterior surface of the second pipe 14 and push the second pipe 14 into the first access point 16 of the first pipe 18. The second pipe 14 may be fed to the injector 23 by a hydraulically or otherwise operated reel 24 onto which the second pipe 14 may be spooled. The reel 24 may cooperate with the injector 23 to push the second pipe 14 into the first pipe 18. Alternatively, the injector 23 or the reel 24 may independently operate to push the second pipe 14 into the first pipe 18. One skilled in the art will appreciate that the first device 12 is not limited to the injector 23 and or the reel 24 illustrated in FIG. 1. Any device suitable for displacing pipe, rope, cords, or other lengthy products may be utilized as the first device. A push control station 25 coupled to the injector 23 and/or the reel 24 may be provided to control the operation of the injector and the reel.

In the exemplary system 10, the second device 20 may be a hydraulically or otherwise operated capstan 26 that is connected to an end of the second pipe 14 by a rope 28. The capstan 26 operates to pull the rope 28, and, thus, the second pipe 14, through the first pipe 18. The rope 28 is preferably a lightweight, high tensile strength rope or cord. Suitable ropes and/or cords include for example wires, wirelines, chains, fiber ropes, wire ropes, tubing and the like. Ropes may be, for example, constructed from kevlar, polypropylene, metals, or other lightweight, high strength materials. In one exemplary embodiment, the rope 28 has a tensile strength of at least 40,000 lbs. An end connector 31 may be provided at the leading end of the second pipe 14 to permit connection of the pipe to the rope 28. The rope 28 may be wound onto a hydraulically or otherwise operated reel 30. The reel 30 may operate to assist the capstan 26 in pulling the second pipe 14 through the first pipe 18. The capstan 26 and the reel 30 may independently operate to affect pulling of the rope 26 and the second pipe 14. One skilled in the art will appreciate that other devices suitable for pulling pipe, rope, cords, wires, etc, including, for example an injector or a winch, may be utilized in conjunction with or in place of the capstan 26 and/or the reel 30. A pull control station 32 coupled to the capstan 26 and/or the reel 30 may be provided to control the operation of the capstan and the reel. The pull control station 32 may also be in wireless or wired communication with the push control station 25 to coordinate the operation of the first device 12 and the second device 20. Alternatively, a single control station may be provided to control operation of the first device 12 and the second device 20.

In certain embodiments, the buoyancy of the rope 28 may be adjusted to provide the rope 28 with neutral or minimal negative buoyancy within a fluid provided in the first pipe 18. Neutral or minimal negative buoyancy may provide extended reach pulling capabilities for the rope 28. Coupling a buoyant material to the rope 28 or constructing the rope 28 from a material having the desired buoyancy characteristics may adjust the buoyancy of the rope 28. For example, a jacket of low-density foam may be extruded onto or otherwise coupled to the rope 28.

The first device 12 and the second device 20 may be operated simultaneously to affect simultaneous pushing and pulling of the second pipe 14 through the first pipe 18. Alternatively, the first device 12 and the second device 20 may be operated separately and independently to introduce the second pipe 14 into the first pipe 18.

Depending on the length of the pipeline being rehabilitated, it may be necessary to connect two or more lengths of pipe for insertion into the pipeline. Thus, in certain embodiments, the second pipe 14 may comprise two or more lengths of pipe connected by one or more pipe-to-pipe connectors 34. Each pipe-to-pipe connector 34 may be fitted with one or more devices, such as a centralizer, for positioning the second pipe 14 radially within the first pipe 18 to minimize instances of the second pipe 14 becoming snagged on obstructions, such as welds or pipe joints, in the first pipe 18. In addition, each pipe-to-pipe connector may be fitted with one or more mechanical rollers or other similar device and may be covered with a material having a low coefficient of friction to facilitate transport of the connector within the first pipe 18.

In certain embodiments, the second pipe 14 may be marked at predetermined spaced-apart distances to permit measurement of the length of the second pipe 14 installed into the first pipe. In the event the second pipe 14 becomes obstructed, the markings may be useful in identifying the location of an obstruction in the first pipe 18. In addition, a magnetic device or an RF transmitter or other type of transmitter may be provided at the leading end or other locations of the second pipe 14 to monitor the advancement of the second pipe 14 through the first pipe 18. In certain embodiments, a relief pin or other similar load relieving device may be coupled to the rope 28 and/or capstan 26 proximate the second device 20. The relief pin may be designed to yield at an axial load less than the maximum tensile load allowable for the second pipe 14.

The second pipe 14 preferably has a high tensile strength to weight ratio to facilitate displacement through the first pipe 18, in particular to facilitate the pulling of the second pipe 14 through the first pipe 18. The desired tensile strength of the second pipe 14 will vary depending on the length and weight of pipe being deployed. In certain exemplary embodiments, the tensile strength of the second pipe 14 may be at least 10,000 lbs. In an embodiment, the tensile strength of the second pipe 14 may have sufficient tensile strength to facilitate displacement through the first pipe 18. The second pipe 14 may be constructed of any material suitable for transporting fluids and having the requisite tensile strength for displacement through the first pipe 18. Other characteristics of the second pipe may include high strength and stiffness in the axial, hoop, and radial direction to carry loads that may be imposed on the second pipe in service, in place of the first pipe, preferably without receiving support from the first pipe. Suitable pipes include metal pipes, for example, steel pipes, pipes constructed from plastics, for example, thermoplastic and thermoset materials, and composite pipes such as fiber reinforced plastic pipes and metal/composite pipes, and composite hoses constructed from reinforces elastomers and plastics. In certain exemplary embodiments, the second pipe 14 is a composite pipe constructed of a fluid impervious inner liner and a composite layer as described in detail below, such as, spoolable composite line pipe available from Fiberspar Corporation of West Wareham, Mass.

In an exemplary method of rehabilitating a pipeline, the second pipe 14 may be inserted into the first pipe 18 and the second pipe 14 may be pushed and/or pulled through the first pipe 18. Initially, the first access point 16 and the second access point 22 may be formed in the pipeline, i.e., the first pipe 18. A pig, plug, or other suitable device may be used to transport the rope 28 or a messenger line between the first access point 22 and the second access point 16. The rope 28 may then be connected to an end of the second pipe 14. The second pipe 14 may then be pushed by the first device 12 and the pulled by the second device 10, through rope 28, to displace the second pipe 14 through the first pipe 18.

Figure 2:
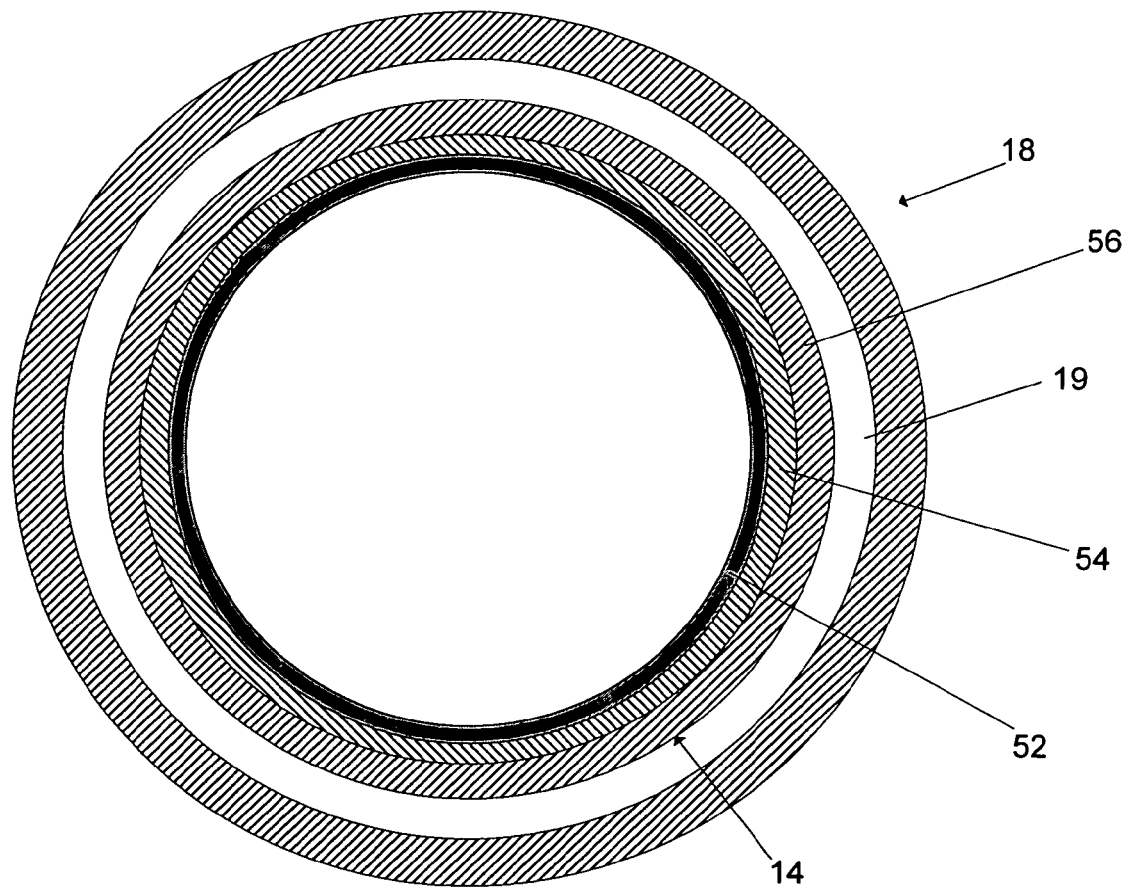
FIG. 2 is a side elevational view of a rehabilitated pipe having a second pipe that includes a buoyancy layer.

The exemplary method may also include flooding the first pipe 18 with a fluid, such as water, prior to and/or during displacement of the second pipe 14 through the first pipe 18. The buoyancy of the second pipe 14 within the fluid of the flooded first pipe 18 may be controlled to facilitate displacement of the second pipe 14 through the first pipe 18. In an embodiment, a rope 28 may then be connected to an end of the second pipe 14 to facilitate displacement through the flooded first pipe 18. As described in detail below, a buoyancy control layer may be provided to the second pipe 14 to adjust the buoyancy of the second pipe 14. FIG. 2 illustrates a second pipe 14 through a first pipe 18, where the second pipe includes a composite tube 50 having an interior liner 52, a composite layer 54, and buoyancy layer 56. In this illustration, the first pipe 18 is flooded with a fluid 19.

Figure 3:
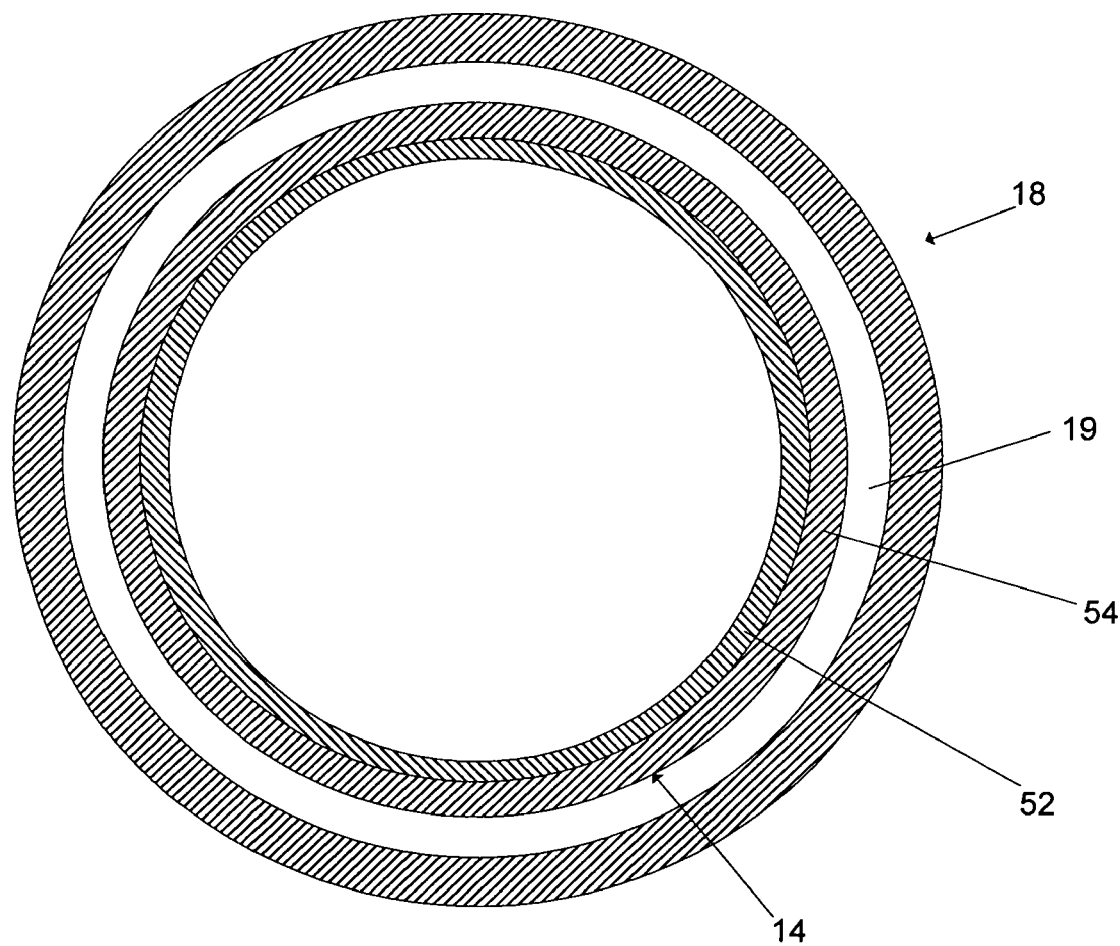
FIG. 3 is a side elevational view of a rehabilitated pipe having a buoyancy controlling fluid controlling the buoyancy of a second pipe.

Alternatively, the first pipe may be flooded with a fluid having a density selected to provide a desired buoyancy to the second pipe 14 to thereby control the buoyancy of the second pipe 14. For example, a dense fluid, such as brine or water-based drilling mud, may be delivered to the first pipe 18 to flood the first pipe 18 such that the second pipe 14 has neutral buoyancy within the dense fluid. FIG. 3 illustrates a second pipe 14 having an interior liner 52 and a composite layer 54 through a first pipe 18, where the first pipe is flooded with a fluid 19 selected to control the buoyancy of the second pipe 14.

The exemplary method may include introducing friction-reducing fluids to the interior of the first pipe 18 to reduce friction forces between the first pipe 18 and the second pipe 14 as the second pipe is displaced through the first pipe 18. The friction reducers may be fluids such as oils or other lubricants that are pumped into the first pipe 18 before or during the pushing/pulling operation.

Another exemplary method may include additional fluids introduced to the interior of the first pipe 18. Examples of additional fluids may include viscofiers, lubricants, stabilizers, anti-foaming agents, and the like.

In certain embodiments, the second pipe 14 may be filled with a fluid, such as water, to allow hydro-testing of the second pipe 14 and any pipe-to-pipe connectors 34 during deployment.

Figure 4:
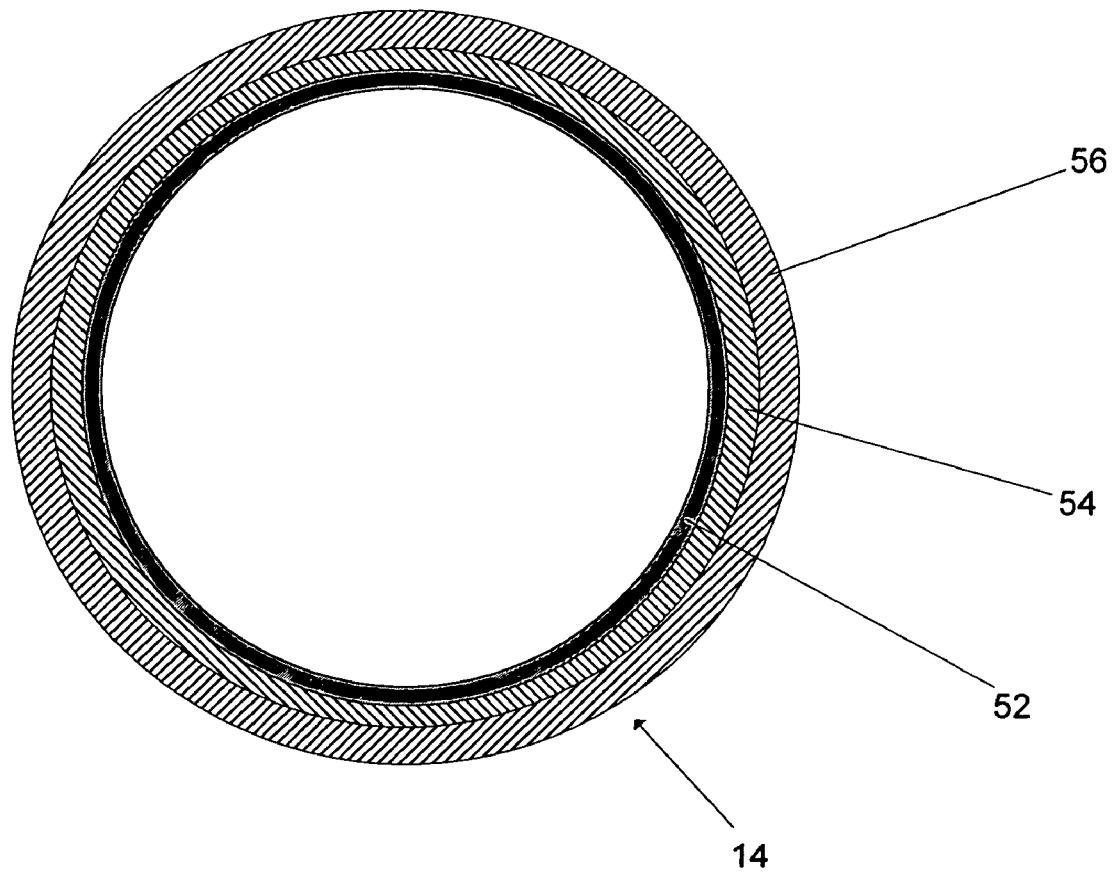
FIG. 4 is a side elevational view in cross-section of a composite pipe having a buoyancy control layer.

An exemplary method of adjusting the buoyancy of a pipe, such as the second pipe 14 described above, may comprise coupling a buoyancy control layer to the pipe. FIG. 4 illustrates an exemplary composite tube 50 having an interior liner 52, a composite layer 54 and a buoyancy control layer 56. The composite tube 50 is generally formed along a longitudinal axis and can have a variety of cross-sectional shapes, including circular, oval, rectangular, square, polygonal, and the like. The illustrated tube 50 has a circular cross-section. The composite tube 50 can generally be constructed in manner analogous to one or more of the composite tubes described in commonly owned U.S. patents and patent applications: U.S. Pat. No. 6,016,845, U.S. Pat. No. 5,921,285, U.S. Pat. No. 6,148,866, U.S. Pat. No. 6,004,639, and U.S. Pat. No. 6,286,558, U.S. patent application Ser. No. 10/134,071 filed Apr. 29, 2002, U.S. patent application Ser. No. 10/134,660 filed Apr. 29, 2002, and U.S. patent application Ser. No. 10/288,600 filed Nov. 5, 2002. Each of the aforementioned patents and patent applications is incorporated herein by reference. Although the following description is in connection with a composite pipe, one skilled in the art will recognize that the buoyancy control layer described herein may be used in connection with any type of pipe, including, for example, steel pipes.

The buoyancy control layer 56 may be a layer of material (s) having a density selected to adjust the overall density of the pipe 50 to provide a desired buoyancy to the pipe. The buoyancy control layer 56 may be coupled to the pipe by extruding a material having the desired density onto the composite layer 54 or other layer of the pipe 50, by wrapping a material having the desired density onto the composite layer 54 or other layer of the pipe 50, or by other methods of coupling a layer of material to layer of the pipe. The buoyancy control layer 56 may be coupled to the pipe 50 during fabrication of the pipe or post-fabrication. The buoyancy control layer 54 may be bonded or un-bonded to the pipe.

In certain embodiments, the buoyancy control layer 56 may be a layer of low density material incorporated within the composite tube to provide buoyancy to at least a longitudinal segment of the composite tube 50. An optional pressure barrier layer as well as other additional layers including additional layers of low-density material and additional composite layers, may be provided external to the layer of low-density material. Although the layer 56 is illustrated as being disposed external to the composite layer 54, the exemplary layer 56 of low density material may be disposed at any point throughout the cross-section of the composite tube 50 including, for example, between the inner liner 52 and the composite layer 54. The layer 56 of low density material may extend along the entire length of the composite tube 50 or may be disposed along one or more discrete lengths of the composite tube 50. The layer 56 of low density material may allow selected longitudinal segments or the entire length of the composite tube to have approximately neutral or minimal negative buoyancy. For pipe rehabilitation as described above, the buoyancy of the second pipe 14 is preferably adjusted to less than a specific gravity of 1.5 grams/cm$^3$ in water.

In an exemplary embodiment, the low-density material for the layer 56 is selected to have a specific gravity of less than or equal to about 1.25 grams/cm$^3$ in water. Suitable low density materials may include, for example, syntactic foams, foamed thermoset or thermoplastic materials such as epoxy, urethane, phenolic, vinylester, polypropylene, polyethylene, polyvinylchlorides, nylons, thermoplastic or thermoset materials filled with particles (such as glass, plastic, microspheres, ceramics), filled rubber or other elastic materials, or composites of these materials. In certain embodiments, the buoyancy control layer 54 may be a thermoplastic foam jacket that may be extruded onto the exterior layer of the pipe 50.

The material of the buoyancy control layer 56 may also be selected to provide increased wear resistance to the pipe 50 and to reduce the coefficient of friction of the exterior of the pipe.

REFERENCES

All publications and patents mentioned herein, including those items listed below, are hereby incorporated by reference in their entirety as if each individual publication or patent was specifically and individually indicated to be incorporated by reference. In case of conflict, the present application, including any definitions herein, will control.

Equivalents

While the systems, methods, and tubes disclosed herein have been particularly shown and described with references to exemplary embodiments thereof, it will be understood by those skilled in the art that various changes in form and details may be made therein without departing from the spirit and scope of the disclosure. Those skilled in the art will recognize or be able to ascertain using no more than routine experimentation, many equivalents to the exemplary embodiments described specifically herein. Such equivalents are intended to be encompassed in the scope of the present disclosure, and such equivalents are intended to be encompassed by the following claims.

We claim:

1. A method of rehabilitating a pipeline comprising a first pipe, the method comprising inserting a second pipe comprising a buoyancy control layer into said first pipe;
   providing a first access point in said first pipe for insertion of said second pipe;
   providing a second access point in said first pipe wherein said second access point is spaced apart from said first access point, and
   pushing and pulling a length of said second pipe through said first pipe.

2. The method of claim 1, further comprising flooding the first pipe with a fluid.

3. The method of claim 1, wherein providing said second pipe with a buoyancy control layer includes extruding a layer on the exterior of said second pipe.

4. The method of claim 1, wherein providing said second pipe with a buoyancy control layer includes wrapping a layer about the exterior of said second pipe.

5. The method of claim 3, wherein said buoyancy control layer comprises a thermoplastic foam.

6. The method of claim 2, further comprising selecting a fluid such that said second pipe has about neutral or minimal negative buoyancy in said fluid.

7. The method of claim 2, further comprising selecting a fluid from the group consisting of brine and water-based drilling mud.

8. The method of claim 1, further comprising providing an injector that operates to push said second pipe into said first access point.

9. The method of claim 8, further comprising connecting a capstan to an end of said second pipe by a rope.

10. The method of claim 9, further comprising operating said capstan to pull said second pipe through said first pipe.

11. A method of rehabilitating a pipeline comprising a first pipe, the method comprising: inserting a second pipe having an extruded buoyancy control layer into said first pipe, said buoyancy layer comprising a layer of material having a density selected to provide a desired buoyancy to said second pipe; and
   pushing and pulling a length of said second pipe though said first pipe.

12. The method of claim 11, wherein said buoyancy control layer has a specific gravity in water of less than about 1.25 g/cm$^3$.

13. The method of claim 11, wherein said buoyancy control layer comprises thermoplastic foam.

14. The method of claim 11, further comprising flooding the first pipe with a fluid.

* * * * *